United States Patent
Poosamani

(10) Patent No.: US 11,818,638 B2
(45) Date of Patent: Nov. 14, 2023

(54) SYSTEM AND METHOD FOR SIGNAL RANGE AWARENESS PROTOCOL FOR SHORT TO MEDIUM RANGE AD-HOC GROUP CALLS

(71) Applicant: Samsung Electronics Co., Ltd., Suwon-si (KR)

(72) Inventor: Nithyananthan Poosamani, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/649,641

(22) Filed: Feb. 1, 2022

(65) Prior Publication Data

US 2022/0256322 A1    Aug. 11, 2022

Related U.S. Application Data

(60) Provisional application No. 63/146,853, filed on Feb. 8, 2021.

(51) Int. Cl.
| | | |
|---|---|---|
| H04W 4/02 | (2018.01) | |
| H04W 4/80 | (2018.01) | |
| H04W 84/18 | (2009.01) | |

(52) U.S. Cl.
CPC ............. *H04W 4/80* (2018.02); *H04W 4/023* (2013.01); *H04W 84/18* (2013.01)

(58) Field of Classification Search
CPC ....... H04W 4/80; H04W 84/18; H04W 4/023; H04W 4/021
See application file for complete search history.

(56) References Cited

U.S. PATENT DOCUMENTS

| | | | |
|---|---|---|---|
| 8,254,387 B2 | 8/2012 | Anderson et al. | |
| 10,484,804 B2 | 11/2019 | Solum et al. | |
| 10,652,675 B2 * | 5/2020 | Piedras | H04W 52/283 |
| 10,841,976 B2 * | 11/2020 | Ferrari | H04R 25/552 |
| 10,972,845 B1 | 4/2021 | Dickmann et al. | |

* cited by examiner

*Primary Examiner* — Tuan H Nguyen

(57) ABSTRACT

A system and method are provided for signal range awareness and reliability for audio communication. The system includes one or more control devices (CDs). The system also includes a plurality of hearing devices (HDs) wirelessly connected to the CDs. Each of the plurality of HDs is within a signal range of the one or more CD. When one or more of the plurality of HDs is determined to be outside the signal range of the CDs, the system is configured to identify another control device for the one or more plurality of HDs to connect. The other control device is connected to the original one or more CDs via a partial mesh network.

20 Claims, 11 Drawing Sheets

SYSTEM AND METHOD FOR SIGNAL RANGE AWARENESS PROTOCOL FOR SHORT TO MEDIUM RANGE AD-HOC GROUP CALLS

CROSS-REFERENCE TO RELATED APPLICATION AND PRIORITY CLAIM

This application claims priority under 35 U.S.C. § 119(e) to U.S. Provisional Patent Application No. 63/146,853 filed on Feb. 8, 2021, which is hereby incorporated by reference in its entirety.

TECHNICAL FIELD

This disclosure relates generally to communication devices. More specifically, this disclosure relates to a system and method for signal range awareness for short to medium range ad-hoc group calls.

BACKGROUND

Mobile electronic devices, such as smartphones and tablet computers, have become the most prevalent device type for communicating in professional and private settings. The mobile electronic device can connect to peripheral accessories to enhance user convenience.

In enterprise devices, such as mobile phones, tablets, and smartwatches, user communications are enabled by licensing or subscription costs for Voice-over-IP (VoIP) or Push-to-Talk (PTT) based solutions. These types of communications require unique hardware, specific RF communications protocols, heavy setup and management costs. These devices are use-case specific, custom-built, bulky and impair worker mobility in many scenarios. To overcome mobility issues, peripheral accessories (e.g., headsets, earbuds) can handle active calls or other communications within short-to-medium range distances. Problems such as signal attenuation, jitters, and the like, can occur when devices for short to medium range communications are more than a distance apart or users move during communication.

SUMMARY

This disclosure relates to a system and method for signal range awareness and reliability for audio communication.

In a first embodiment, an electronic device includes a communication circuit configured to communicate via a first communication medium. The first communication medium comprising a short-range communication medium. The electronic device also includes a processor is configured to control the communication circuit to connect to a first hearing device (HDs) within a signal range of the electronic device. The processor is also configured to in response to determining that a second HD is outside the signal range, identify another control device (CD) for connection to the second HD. The other CD is communicatively coupled with the electronic device via a partial mesh network.

In a second embodiment, a method includes connecting, by a first control device (CD) via a first communication medium, to a first hearing device (HDs) within a signal range of the first CD. The first communication medium comprising a short-range communication medium. The method further includes in response to determining that a second HD is outside the signal range, identifying a second CD for connection to the second HD. The second CD is communicatively coupled with the first CD via a partial mesh network.

In a third embodiment, a signal range awareness and reliability system for audio communication is provided. The system includes one or more control devices (CDs). The system also includes a plurality of hearing devices (HDs) wirelessly connected to the CDs. Each of the plurality of HDs is within a signal range of the one or more CD. When one or more of the plurality of HDs is determined to be outside the signal range of the CDs, the system is configured to identify another control device for the one or more plurality of HDs to connect. The other control device is connected to the original one or more CDs via a partial mesh network.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc, a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
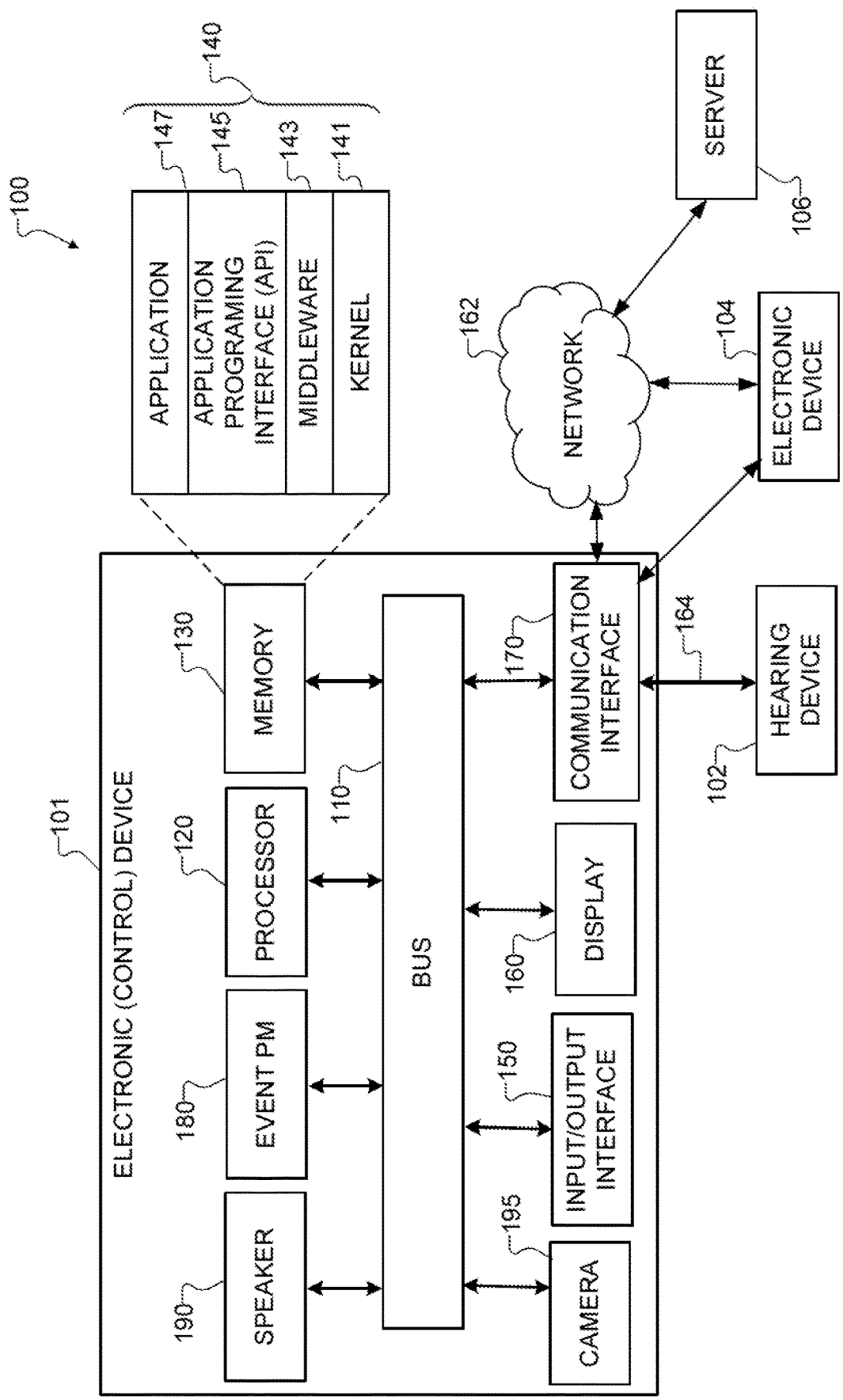
FIG. 1 illustrates an example network configuration including an electronic device in accordance with this disclosure.

FIGS. 1 through 11, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, mobile electronic devices, such as smartphones, tablet computers, and smart watches, user communications are enabled by licensing or subscription costs for VoIP or PTT based solutions. The communications may require unique hardware, specific RF communications protocols, heavy setup, and management costs. These devices are use-case specific, custom-built, bulky and impair worker mobility in many scenarios. To overcome mobility issues, accessories (e.g., headsets, earbuds) need an enterprise device (also called as control device) to control or handle active calls/communications within short-to-medium range distances.

Current short range and ad-hoc networks can experience problems such as call reliability in an ad-hoc, non-internet based, short-range wireless communication group call is an area of concern. Users either stay in the call or are disconnected based on signal attenuation characteristics. Current enterprise options include a license or subscription cost-based solution involving a mobile carrier. This involves infrastructure requirements including need for internet/intranet architecture to transfer voice/communication packets through a network. A user experience in such calls is limited to start and end/disconnect of calls. They are not designed to advise or guide a user to move towards a better signal zone. In case of contiguous poor signal ranges, auto-switch to other wireless technologies to sustain the call and to extend the communication range without additional infrastructure is an unsolved problem.

Embodiments of the present disclosure provide a light-weight, out-of-box communication solution for enterprise users and use-cases with no additive infrastructure or maintenance costs and with much emphasis on call reliability and dynamic call management based on user distancing parameters. Embodiments of the present disclosure provide a system and method that improves a call reliability that covers all control devices, such as phones, tablets, watches, which have more energy to perform heavy computations and peripheral hearing devices, such as wireless headsets, earbuds, which have comparatively less energy and computational power. Embodiments of the present disclosure provide a system that supports a signal range awareness and reliability protocol running in compatible devices for continuous call reliability monitoring. Certain embodiments provide a system capable of self-expanding and contracting a partial mesh topology of interconnected nodes or devices. Certain embodiments provide a system that guides a user to move to suitable location for better signal connectivity using AR functionality. Certain embodiments provide a protocol that automatically switches a connection between a BLUETOOTH short-range signal, WI-FI DIRECT or Ultra-wideband (UWB) wireless technology based on the hardware compatibility of control and hearing devices associated in the call. Certain embodiments provide a protocol that automatically switches underlying wireless connection technology to extend the range of connection to include more users in the call dynamically. Certain embodiments provide a method that enables a connection between peripheral devices, such as an edge hearing device with another hearing device connected directly with control device to allow users to connect in group calls without a need for their control devices. Certain embodiments provide a method that enables a direct communication between two leaf hearing devices connected directly to single control device to allow users within a family connected to single control device to communicate directly without need to route data via control device.

FIG. 1 illustrates an example network configuration 100 in accordance with this disclosure. The embodiment of the network configuration 100 shown in FIG. 1 is for illustration only. Other embodiments could be used without departing from the scope of this disclosure. As shown in FIG. 1, according to embodiments of this disclosure, an electronic device (also referenced herein as "control device") 101 is included in the network configuration 100. The electronic device 101 may include at least one of a bus 110, a processor 120, a memory 130, an input/output (I/O) interface 150, a display 160, a communication interface 170, or an event processing module 180. The electronic device 101 may also include a speaker 190 and camera 195. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device. Additionally, the communication interface 170 can establish a communication with the external electronic device 102 using a near field communication (NFC) or short-range communication protocol such as BLUETOOTH, WI-FI DIRECT, ZIGBEE or an ultra-wideband wireless technology.

The first external electronic device (also referenced herein as a "hearing device") 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high-definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

The camera 195 can be configured to capture still or moving images. For example, the camera 195 can capture a single frame or multiple frames. In certain embodiments, the camera 195 is a single camera. In certain embodiments, the camera 195 is an imaging system that includes multiple cameras. In certain embodiments, the camera 195 comprises a camera disposed beneath the display 160, namely an under-display camera (UDC).

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, a I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

In some embodiments, the processor 120 or event processing module 180 is configured to communicate with the server 106 to download or stream multimedia content, such as images, video, or sound. For example, a user operating the electronic device 101 can open an application or website to stream multimedia content. The processor 120 (or event processing module 180) can process and present information, via the display 160, to enable a user to search for content, select content, and view content. In response to the selections by the user, the server 106 can provide the content or record the search, selection, and viewing of the content, or both provide and record.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
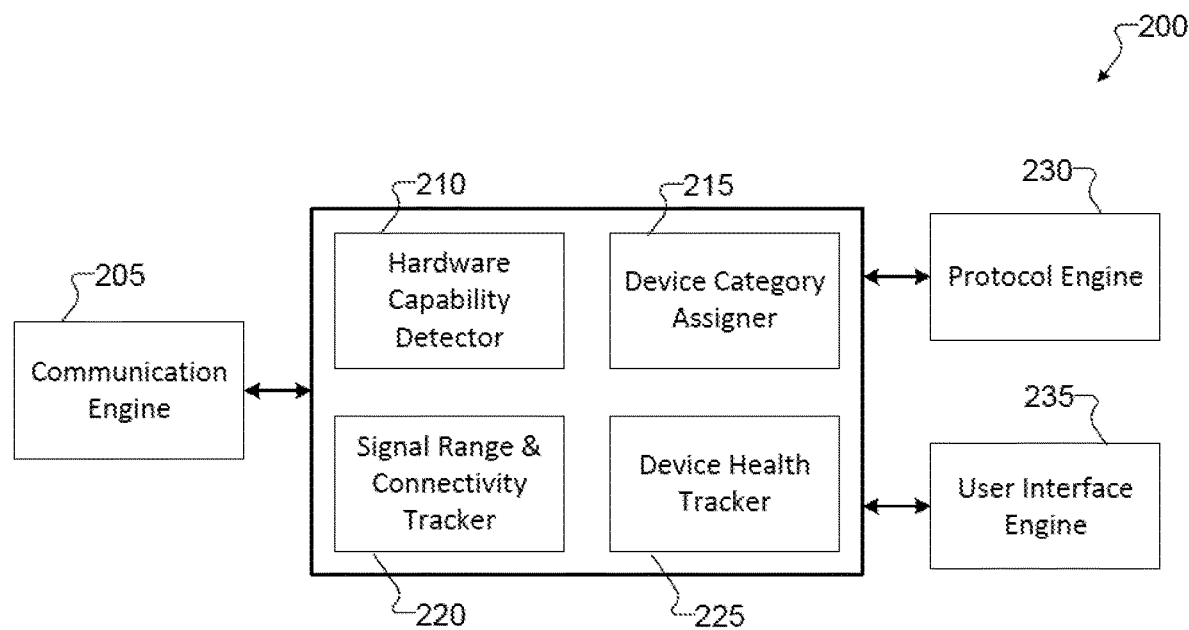
FIG. 2 illustrates an example processing control engine in accordance with this disclosure.

FIG. 2 illustrates an example processing control engine in accordance with this disclosure. The embodiment of the processing control engine 200 shown in FIG. 2 is for illustration only. Other embodiments could be used without departing from the scope of the present disclosure. For ease of explanation, the processing control engine 200 may be described as being a processor, multiple processors, included in processor 120, or used by the electronic device 101 in the network configuration 100 of FIG. 1. However, the processing control engine 200 may be included in or used by any other suitable device and in any other suitable system, such as a system that includes a processing and communications system.

The processing control engine 200 is configured to communicate with a communication engine 205 of a device, such as electronic (control) device 101 or electronic (hearing) device 102. The communication engine 205 can be implemented by or included in the communication interface 170. The communication engine 205 can be a communication circuit configured to enable a communication via one or more of: BLUETOOTH, WI-FI DIRECT, ZIGBEE or an ultra-wideband wireless technology. The communication engine 205 can be a module that interfaces with the internal hardware and software stacks in any mobile operating system (OS) architecture to enable data and other associated signaling communications between plurality of devices. The communication engine 205 interacts with the processing control engine 200 via regular OS communication links or interfaces.

The processing control engine 200 includes a hardware capability detector 210, a device category assigner 215, a signal range and connectivity tracker 220, and a device health tracker 225. The processing control engine 200 also communicates with a signal range awareness and reliability (SAR) protocol engine 230 and a user interface (UI) engine 235. The processing control engine 200 coordinates and interacts with multiple other modules to achieve overall SAR system and methodology. The processing control engine 200 can be implemented in a single hardware processor or one or more hardware processors in a multi-processor system.

The hardware capability detector 210 is configured to detect a hardware capability of the device. The hardware capability detector 210 determines whether the communication engine 205 has one or more of BLUETOOTH, WI-FI DIRECT, ZIGBEE or an ultra-wideband wireless technology.

The device category assigner 215 assigns a device category to a device based on the device types associated with the device. When the device is an electronic device such as a mobile phone, a tablet, or a smartwatch, the device category assigner 215 assigns the device into a control category. When the device is a hearing device such as a headsets or earbuds, and the like the device category assigner 215 assigns the device as a mass hearing device category.

The signal range and connectivity tracker 220 determines details necessary for identifying and detecting if the signal range of the device is within a predetermined signal range. The range and connectivity tracker 220 tracks the RF communication signal range characteristics, statistics such as Signal to Noise Ratio (SNR) in decibels (dB), Received Signal Strengths (RSSI) in dB or dBm, Service Set Identifier (SSID) as a string, a Basic Service Set Identifier (BSSID) as a string, and the like. For example, the signal range and connectivity tracker 220 can detect one or more of values of the RSSI and SNR and compare such against a threshold limit. Additionally, the signal range and connectivity tracker 220 can determine the particular device being connected to the SSID, and the like. The signal range and connectivity tracker 220 further tracks the aforementioned parameters and based on the detected values, issues instructions to switch the setup to change one or more of the parameters.

The device health tracker 225 is configured to track one or more metrics related to device health. For example, the device health tracker 225 can monitor a battery to determine a state of charge, estimated period until energy dissipation, a battery life, and the like.

The SAR protocol engine 230 includes: an algorithm to control the addition/removal of a compatible hearing device in the short-range call system. The SAR protocol engine 230 also includes an algorithm to control the expansion and contraction of partial mesh topology network based on number of participating compatible hearing devices. Additionally, a CD can run a full-version of the SAR protocol engine 230 that handles both the addition and removal of devices and expansion and contraction of mesh topology. An HD can run a lite-version of this SAR protocol engine 230. The lite-version can be a lighter or simpler version of the full-version of the SAR protocol engine 230. The lite-version handles addition and removal of devices but sends protocol and sync data back to CDs.

The UI engine 235 is configured to provide an operator of the electronic device with an indication regarding the signal connectivity. The UI engine 235 can provide a visual, audible, or tactile indication to the operator regarding a better location for signal quality. For example, the UI engine 235 can provide an indication to nudge the operator with UI screen to move towards a position or location or physical space with better signal connectivity as determined by the processing control engine 200. Examples of the indication can include one or more of: a visual indicator displayed on a display, such as display 160; an audible sound, such as verbal instructions to move right, left, forward, or backward; a vibration on one or more edges of the electronic device; and so forth. The visual indicator can be one or more of: an arrow displayed on the screen, words displayed on the screen, lights or light bars displayed on the screen, and the like. Examples of the visual, audible, or tactile indication are provided for illustration only and other types of visual, audible, or tactile indications could be used without departing from the scope of the present disclosure.

Figure 3:
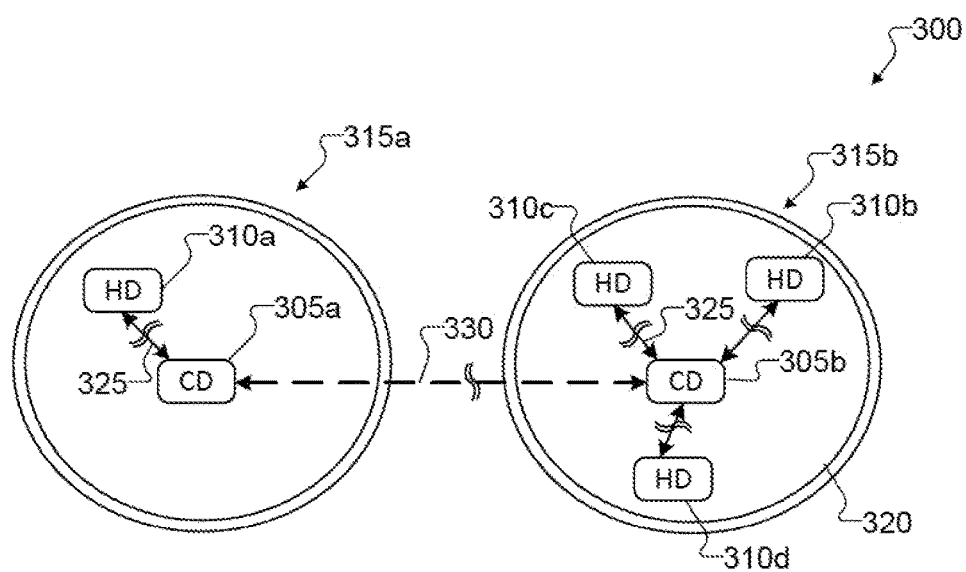
FIGS. 3-5 illustrate an example of ad-hoc group communication in accordance with this disclosure.
Figure 4:
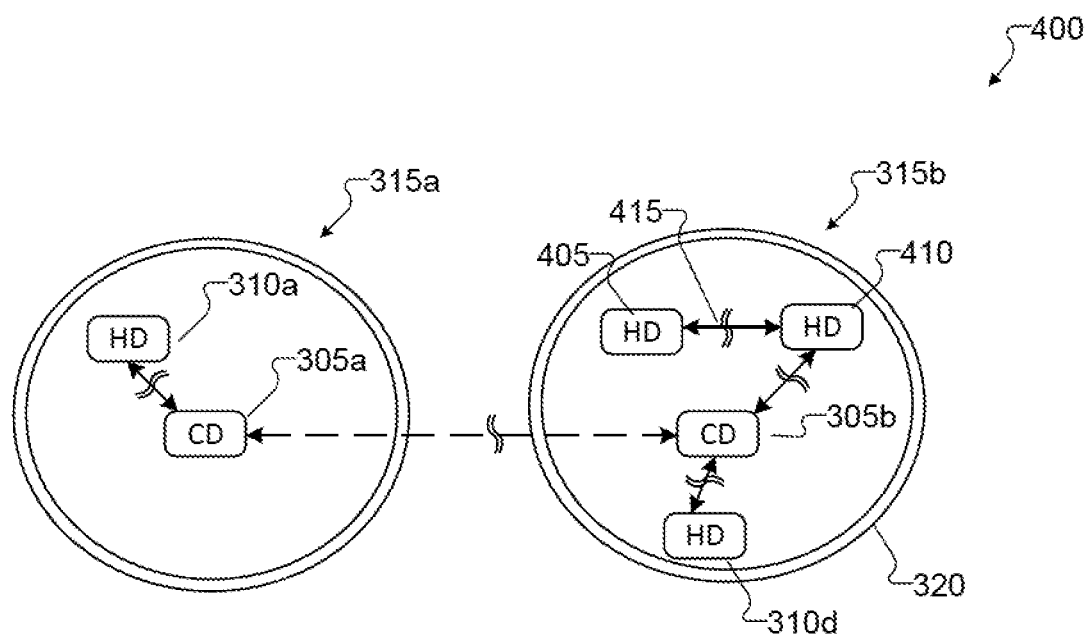
Figure 5:
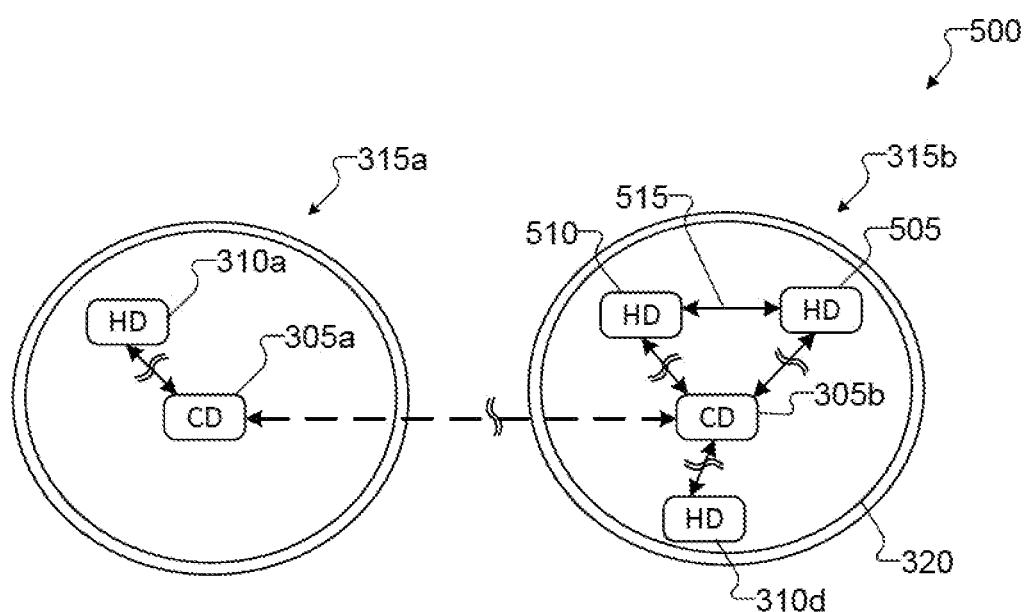

FIGS. 3-5 illustrate an example of ad-hoc group communication in accordance with this disclosure. The embodiments of the ad-hoc group communications shown in FIGS. 3-5 are for illustration only. Other embodiments could be used without departing from the scope of the present disclosure.

In the examples shown in FIGS. 3-5, the ad-hoc group communications occur between and among one or more control devices (CD) 305 and one or more hearing devices (HD) 310. A CD 305 is any device having high processing/computation power and energy. Examples of CDs 305 include smartphones, tablets, watches and other IOT devices, such as plugged-in voice assistants/speakers/microphones. A HD 310 is any device having less processing/computation power. Examples of HDs 310 include headphones, earphones, ear buds and other IOT devices such as battery powered voice assistants/speakers/microphones.

A number of HDs 310 that can connect to a CD 305 and a number of CD 305 that can connect with each other depends on physical capability of underlying communication hardware, such as whether the connection is a multi-BLUETOOTH connection that supports more than one BLUETOOTH connection by the same device, or a WI-FI DIRECT supports that multiple connections from a single WI-FI source device. Embodiments of the present disclosure are configured for operation with various electronic device irrespective of the hardware configurations for the communication protocols and no inference is presented to increase or decrease the general technical specification provided by the RF communication protocol and as such is not a liability or limitation for the scope of this disclosure.

In the example shown in FIG. 3, an ad-hoc group communication 300 is shown in which bi-directional communications occur between a first CD 305a and a second CD 305b. Each of the CDs 305 is disposed within a respective clique 315. A clique 315 is a group of participating compatible devices having a minimum of one CD 305 and one or more HDs. An HD 310 that is connected directly to a CD 305 is also called a Leaf HD.

A CD 305 is able to communicate with one or more HDs 310 within a certain visibility range, as defined by the respective technologies and capabilities. The signal visibility range of HDs which are connected to the CD 305 inside a clique is called the clique communication range (CCR). For example, CD 305b is configured to communicate with HDs 310b-d within a CCR 320. Though CD 305b can have a higher power and range to connect to other CDs 305 further away using other compatible short-to-medium range RF communication protocol, the CCR 320 is primarily limited to BLUETOOTH connectivity range since HDs 310 are predominately BLUETOOTH enabled.

Each CD 305 can have a respective intra-clique connectivity 325 between one or more HDs 310. For example, CD 305b has intra-clique connections 325 with HDs 310b-d and CD 305a has an intra-clique connection 325 with HD 310a. The intra-clique connectivity 325 includes voice data and other signaling/sync protocol data. Additionally, each CD 305 can have an inter-clique connectivity 330 with another CD 305 in a different clique. For example, CD 305a in the first clique 315a has an inter-clique connection 330 with CD 305b in the second clique 315b. The inter-clique connectivity 330 includes voice data and other signaling/sync protocol data. Inter-clique communications 330 can ONLY occur between CDs belonging to different cliques.

In certain embodiments, the number of HDs 310 connectable to a CD 305 is capped at a specified number to maintain call quality. In certain embodiments, the number of one or more CDs 305 connected to the plurality of HDs 310 is optimized (increased or decreased) depending on a call quality metric, power availability of control device and the number of connected 310.

In certain embodiments, at least one HD can relay communications to another HD. In the example shown in FIG. 4, an ad-hoc group relay communication 400 in which a second HD 405 is configured to be a relay for communications with a third HD 410. As such, the second HD 405 is configured as a relay HD. The third HD 410 is connected to the relay HD 405 in a relay fashion and relay HD 405 does not have a direct connection to CD 305b. That is, the second HD 405 is not connected to CD 305b; rather the second HD 405 is connected only to leaf HD 410. As noted herein above, the HDs that are connected to a CD are Leaf HDs. Accordingly, the third HD 410 is a leaf HD.

HD 405 includes custom software/hardware capabilities to relay signal between HDs. For example, HD 405 may include a receiver and transmitter, or a transceiver. Embodiments of the present disclosure are configured to utilize any peripheral hearing device with the technological capability as a relay and the particular hardware technology of the peripheral devices do not alter the scope of the present disclosure.

HD 405 and HD 410 are configured to form a communication link 415. The communication link 415 includes voice data and other signaling/sync protocol data.

The ad-hoc group relay communication 400 allows users to connect to quick group calls without a need for being near the control device. For example, an industry floor worker who does not carry her phones or tablets close to them while working may still achieve connectivity through a relay hearing device that is within range of a leaf HD connected to the controlling phone or tablet.

In certain embodiments, two HDs are configured to exchange data with each other. In the example shown in FIG. 5, an ad-hoc group direct link communication 500 in which a first HD 505 and a second HD 510 are configured to exchange data with each other. The first HD 505 and the second HD 510 are both connected to CD 305b. As such, both the first HD 505 and the second HD 510 are leaf HDs. The first HD 505 and the second HD 510 are further configured to also establish a direct communication link 515 in addition to the connection to CD 305b. The direct communication link 515 includes voice data and other signaling/sync protocol data.

Each of the first HD 505 and second HD 510 includes custom software/hardware capabilities to transmit or relay signals between HDs. For example, Each of the first HD 505 and second HD 510 may include a receiver and transmitter, or a transceiver. Embodiments of the present disclosure are configured to utilize any peripheral hearing device with the technological capability as a relay and the particular hardware technology of the peripheral devices do not alter the scope of the present disclosure.

The ad-hoc group direct link communication 500 allows users to connect to quick group calls without need for communicating or transferring data via their control device. For example, one or more family members with multiple earphones or ear buds and another individual family member can quickly perform push-to-talk or similar communications between them, via the hearing devices and one controlling phone or tablet, without physically dialing or joining a group call. As an additional example can be shown when one of the edge HDs is connected to the CD but not in good range with respect to the CD, but another nearby HD is within range of the CD. The nearby HD can communicate with the HD, similar to a relay HD. Even though the HD's are connected directly, the direct communication link 515 between the HDs enables calls can happen between the two HDs directly without the need of going through the CD and associated CD overhead. The direct data transfer and communication is able to occur between hearing devices directly. As such, the overhead that occurs from transmitting all communications via the controlling phone/tablet is removed as a result of the direct communication link 515.

Figure 6:
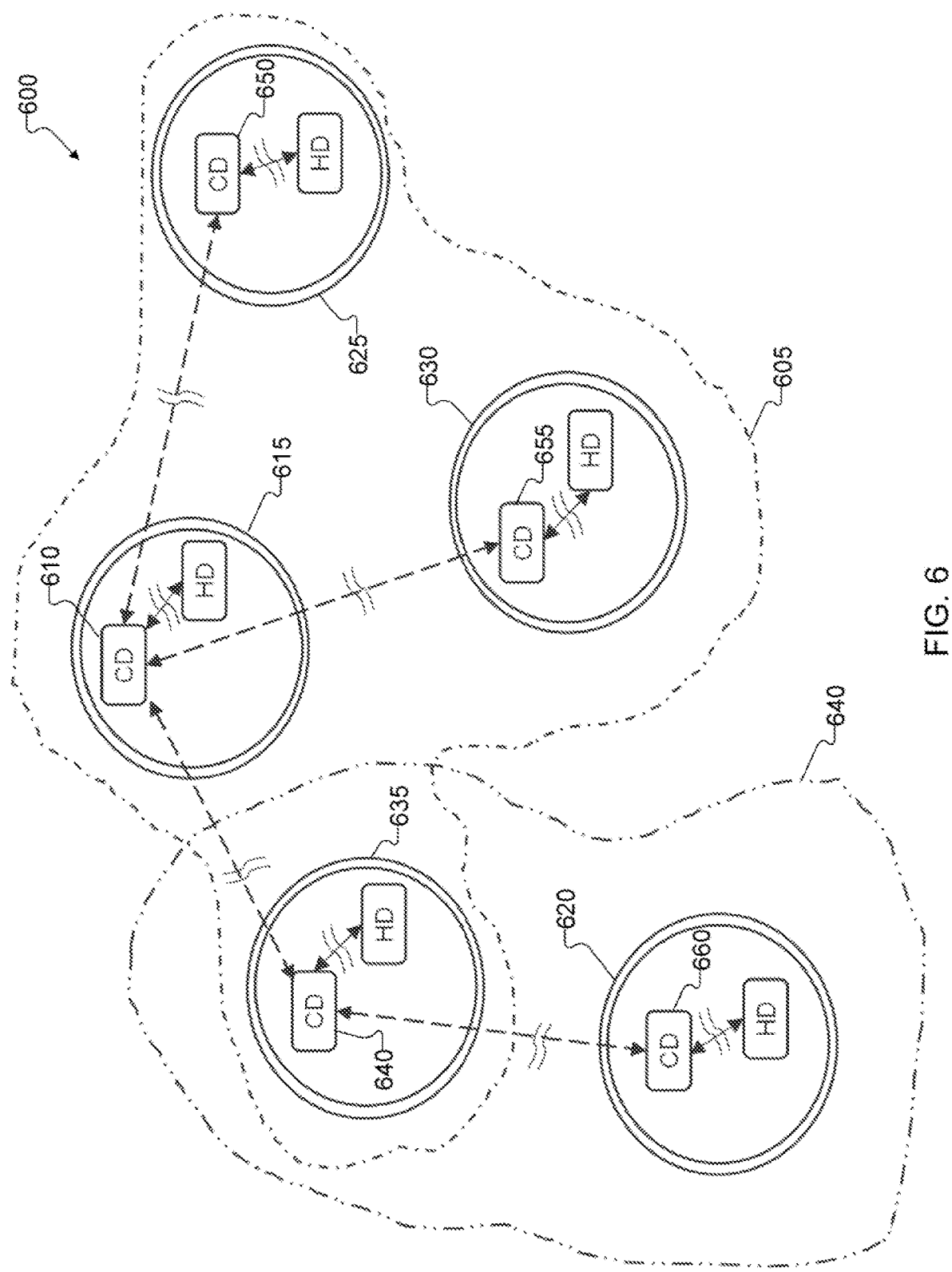
FIG. 6 illustrates an example of a partial mesh network in accordance with this disclosure.

FIG. 6 illustrates an example of a partial mesh network in accordance with this disclosure. The embodiments of the partial mesh network 600 shown in FIG. 6 is for illustration only. Other embodiments could be used without departing from the scope of the present disclosure.

In the example shown in FIG. 6, a partial mesh network 600 includes multiple cliques. The network is referenced as a partial mesh network 600 because not all the cliques are included in the same CD Communication Range (CDCR) of one CD. For example, the CDCR 605 of CD 610 of a first clique 615 does not include second clique 620. As stated previously, a CD by virtue of better power and better connectivity hardware/RF radios, has much better range than the HDs within that clique. Also, the CDCR is not only limited to BLUETOOTH but may be connected via WI-FI or UWB signal ranges. This CDCR determines the ability of a CD in particular clique to be a "primary node" or "secondary node".

One of the CDs is a primary control device, namely, the primary node, while the remaining CDs are secondary nodes. The primary control device is the CD that controls the communication and the overall call by interfacing with all the other cliques. A CD or clique becomes the primary CD or primary clique based on inter-clique connections. The more cliques that are present within the CDCR of a CD, the higher the probability that the CD will be the primary control device.

As noted herein above, the CD 610 in the first clique 615 has a CDCR 605. The CDCR 605 is essentially the CD 610/first clique 615 communication range. A number of cliques have moved within or are located within CDCR 605. For example, third clique 625, fourth clique 630, and fifth clique 635 are located within CDCR 605. Additionally, CD 640 has CDCR 645. In the examples shown in FIG. 6, the second clique 620 is located within CDCR 645.

The CD 610 in the first clique 615 has inter-clique connections to three cliques, namely third clique 625, fourth clique 630, and fifth clique 635. Additionally, the CD 640 in fifth clique 635 has two connections, namely second clique 620 and the first clique 615. Further, CD 650 in third clique 625, CD 655 in fourth clique 630, and CD 660 in second clique 620 each have one inter-clique connection. Hence, the CD 610 in the first clique 615 is the primary node of this partial mesh network 600. The remaining CDs 640, 650, 655, and 660 are secondary nodes. CD 610 is the primary control device (primary node). As the primary control device, CD 610 decides whether to expand and contract the group calling network since the primary node maintains the largest number of connected devices. If during any stage of protocol execution, a secondary node exceeds the number of connections for a primary node, the secondary node relays the information to all other nodes and assumes the charge of primary node. For example, if CD 640 in the fifth clique 635 connects with two more cliques, thus increasing the inter-clique connections to four, CD 640 in the fifth clique 635 relays the information to all other nodes and assumes the charge of primary node. Thereafter, the CD 610 in the first clique 615 becomes a secondary node.

In certain embodiments, in the overall scheme of SAR mesh protocol datasets, each CD will register information such as:
  Name or string identifier of primary CD node;
  Number of inter-clique connections for primary CD node;
  Number of inter-clique connections for their node; and
  Number of intra-clique connections for their node.

To determine the primary and secondary nodes, a node-tie system is utilized. There is no "tie" in the partial mesh network 600 system with respect to which node becomes the primary node. A tie for primary nodes is not permitted because, unless another secondary node exceeds the number of connections for a primary node, the current primary node will remain as the primary node even though another secondary node may have same number of inter-clique connections as the primary node. The node-tie method employed is used to select the primary node based on two values. The two values are the name of primary node and number of connections of the primary node. Unless the number exceeds primary node connections, the name of primary is not relayed or propagated across the system. The node-tie method is part of the partial mesh network 600 topology because of fact that not every node/device is connected to every other node/device in system. This helps in to better manage a dynamically expanding and contracting network of connected devices.

Figure 7:
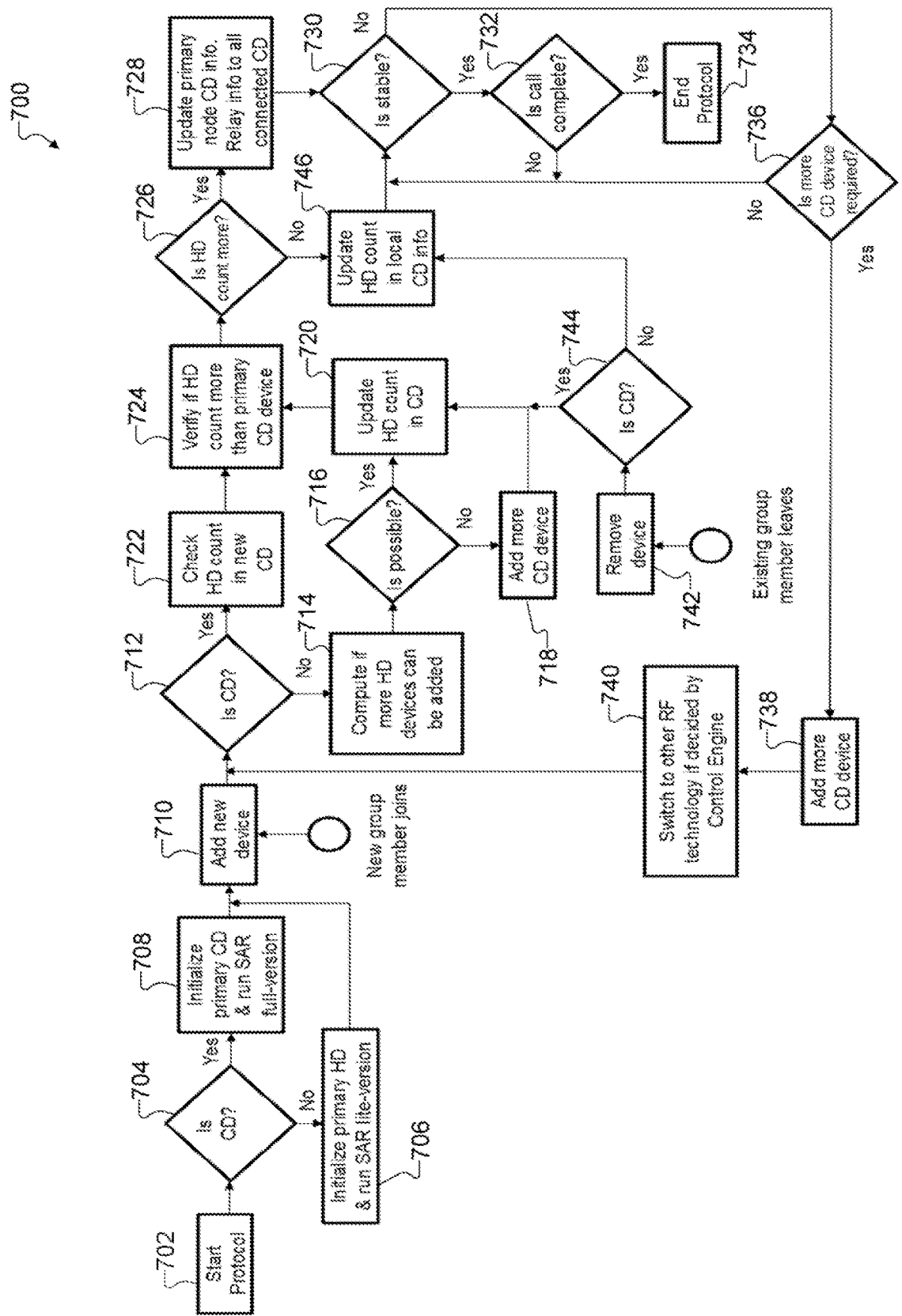
FIG. 7 illustrates a process for mesh formation and operation in accordance with this disclosure.

FIG. 7 illustrates a process for mesh formation and operation in accordance with this disclosure. While FIG. 7 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 700 depicted can be implemented by one or more processors in mobile electronic device, such as by one or more processors 120 of an electronic device 101.

In operation 702, the mesh formation starts. It is noted that operation 702 is illustrated for explanation only and the mesh formation process may be continuously running without start or completion (as in operation 734). In operation 704, a determination is made as to whether the joining device is a CD or HD. In certain embodiments, the number of HDs 310 connectable to a CD is capped at a specified number to maintain call quality. In certain embodiments, the number of one or more CDs 305 connected to the plurality of HDs is optimized (increased or decreased) depending on a call quality metric, power availability of control device and the number of connected plurality of hearing devices. If the device is an HD, the device is initialized as a primary HD and the SAR lite-version is run in operation 706. If the device is a CD, the device is initialized as a primary CD and the SAR full-version is run in operation 708. The new initialized device is added to the partial mesh network 600 in operation 710. Operation 710 is performed when a new member joins as well. In operation 712, a determination is made as to whether the new device is a CD or HD. If the new device is an HD in operation 712, a determination is made as to whether another HD can be added in operation 714. If adding a new HD is not possible in operation 716, a new CD is added in operation 718. In response to adding the CD in operation 718 or if adding a new HD is possible in operation 716, the HD count is updated in operation 720. If it is determined that the new device is a CD in operation 712, the HD count is checked for the new CD in operation 722 and it is verified as to whether the HD count is more than the primary CD 724. If the HD count is more in operation 726, the primary node CD information is updated and relayed to all connected CDs in operation 728. In operation 730, a determination is made whether the partial mesh network is stable. If the partial mesh network is stable in operation 730, the call proceeds in operation 732 until the call ends and protocol terminates in operation 734. If the partial mesh network is not stable in operation 730, the process continues to determine whether another CD is required in operation 736. If another CD is not required, stability is checked again in operation 736. If another CD is required, another CD is added in operation 738. In operation 740, a switch to another RF technology if decided by the processing control engine. Additionally, if an existing group member leaves, the corresponding device is removed in operation 742. If the removed device is a CD in operation 744, the HD count is updated in operation 720. If the removed device is an HD in operation 744 or if the HD count is not more in operation 726, the HD count is updated in operation 746.

Figure 8A:
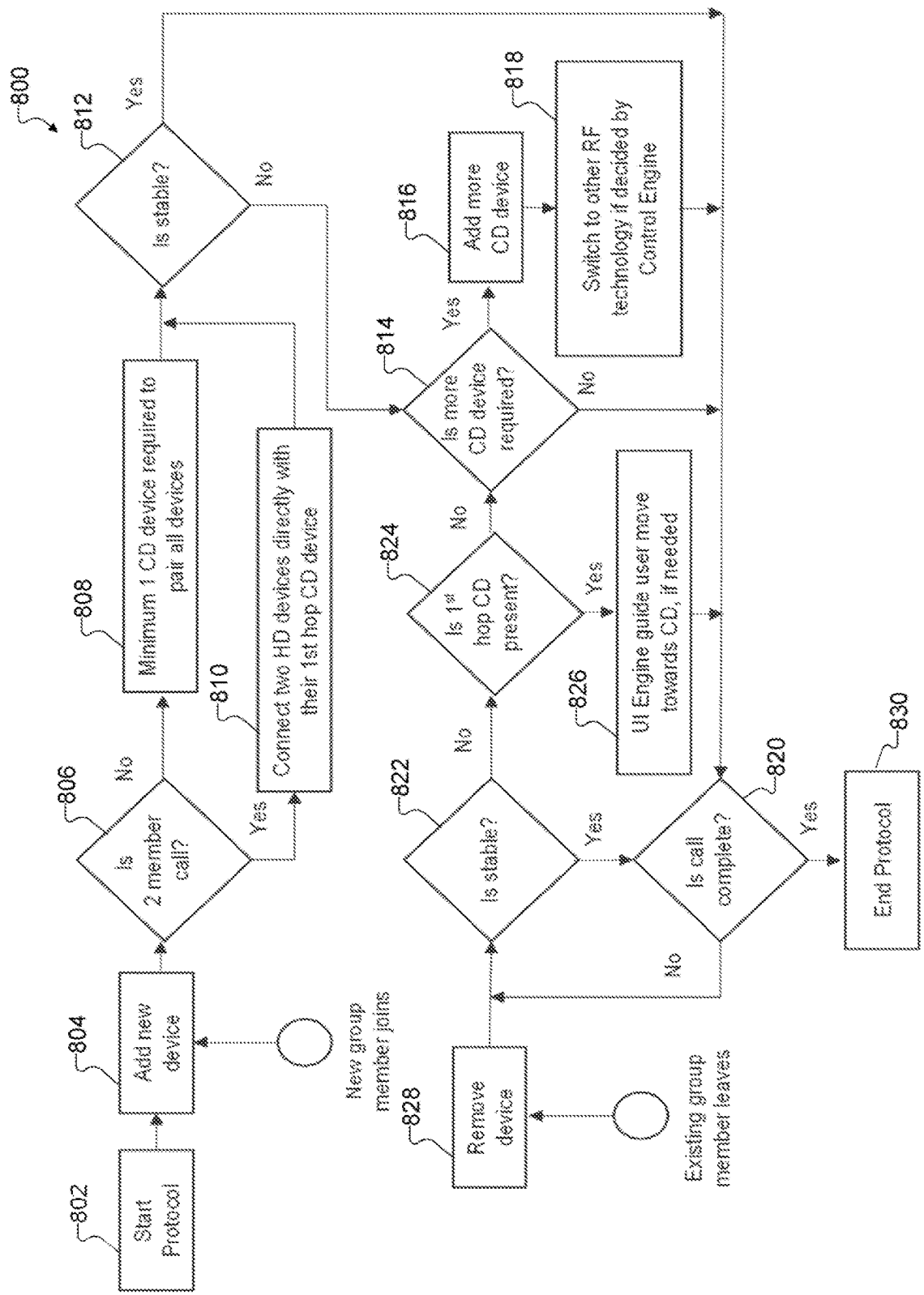
FIGS. 8A-8C illustrate additional processes for mesh formation in accordance with this disclosure.
Figure 8B:
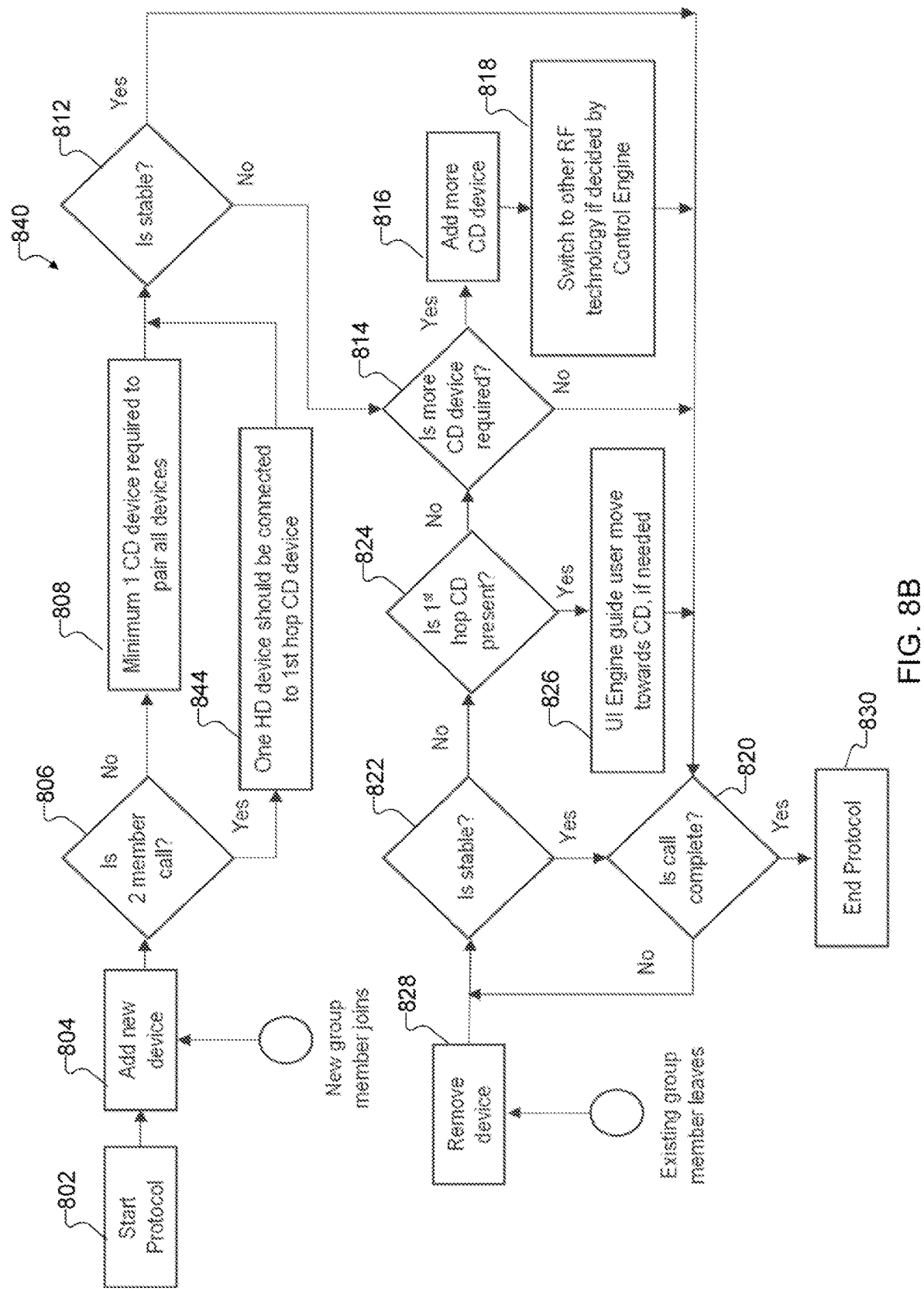
Figure 8C:
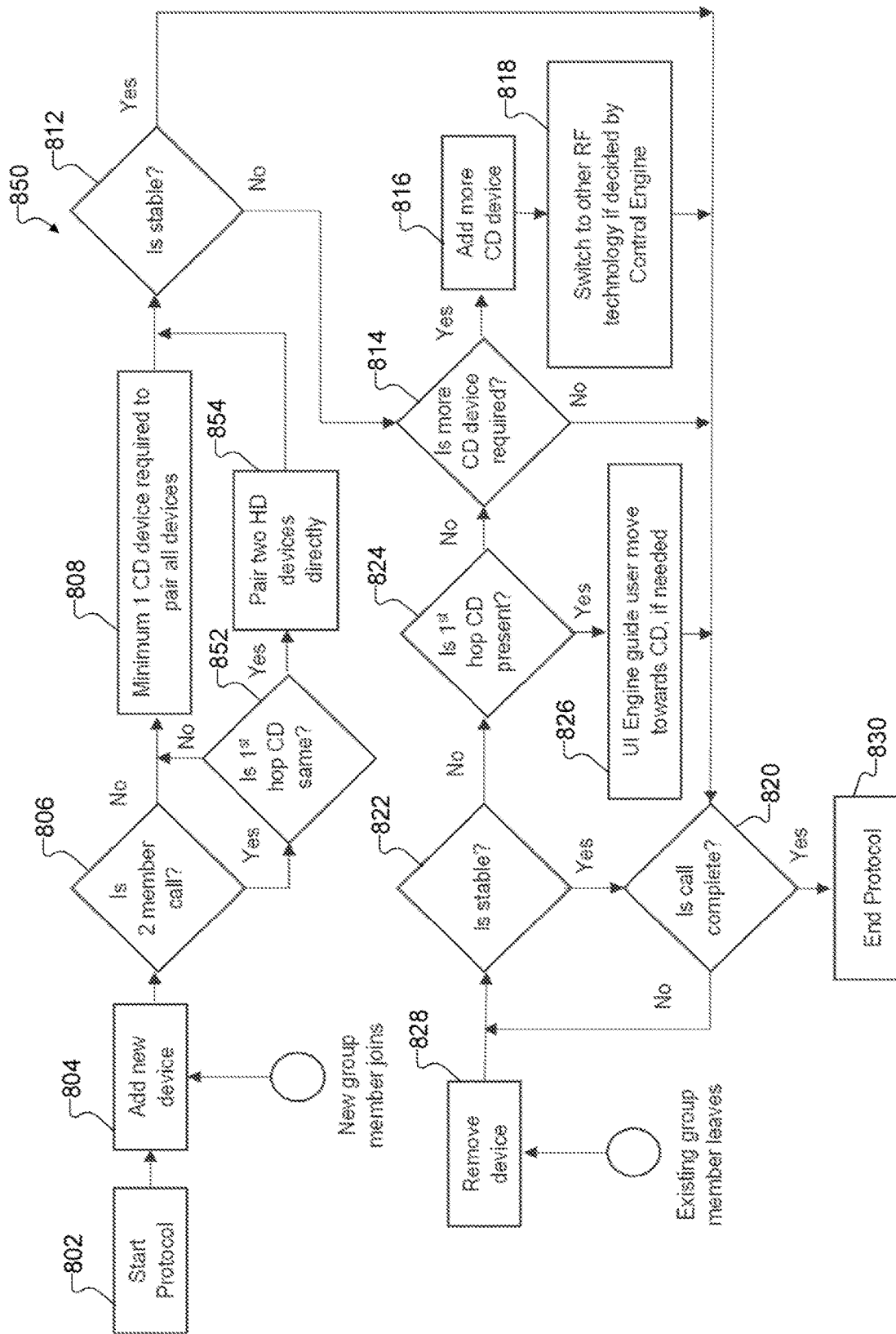

FIGS. 8A-8C illustrate additional processes for mesh formation in accordance with this disclosure. While FIGS. 8A-8C depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 700 depicted can be implemented by one or more processors in mobile electronic device, such as by one or more processors 120 of an electronic device 101.

In certain embodiments, all HDs are connected to any CD within the clique. FIG. 8A illustrates an example in which all HDs are connected to any CD within the clique. When devices are connecting to the call for the first time, there will only be two members in the call and, therefore, they are connected to their first hop CD directly in the clique.

In operation 802, the mesh formation process 800 starts. It is noted that operation 802 is illustrated for explanation only and the mesh formation process may be continuously running without start or completion (as in operation 830). A new group member joins and a corresponding new device is added in operation 804. In certain embodiments, the number of HDs 310 connectable to a CD is capped at a specified number to maintain call quality. In certain embodiments, the number of one or more CDs 305 connected to the plurality of HDs is optimized (increased or decreased) depending on a call quality metric, power availability of control device and the number of connected plurality of hearing devices. In operation 806, the primary control device determines whether there is a two-member call occurring. If a two-member call is not occurring, a minimum of one CD is required to pair the HDs in operation 808. If a two-member call is occurring, at least two HDs are connected directly with their first hop CD in operation 810. In response to operations 808 or 810, the primary control device determines wither the partial mesh network is stable in operation 812. If the network is not stable, the primary control device determines whether more CD's are required in operation 814. If more CDs are required, one or more CDs are added in operation 816. Then, the primary control device switches to another RF technology, if decided by the processing control engine, in operation 818 and the process proceeds to determine whether the call is complete in operation 820. Additionally, if the network is stable in operation 812, the primary control device determines whether the call is complete in operation 820. If the call is not complete, the primary control device again determines whether the partial mesh network is stable in operation 822. If the network is stable, the process proceeds to operation 820 to determine if the call is complete. If the network is not stable, the primary control device determines whether the first hop CD is present in operation 824. If the first hop CD is present, the UI Engine guides a user to move towards the CD if needed in operation 826; otherwise, the process proceeds to operation 814 in which a determination is made again as to whether more CDs are required. If more CDs are not needed in operation 814, the primary control device determines whether the call is complete in operation 820. After the UI Engine has guided the user in operation 826, the primary control device determines whether the call is complete in operation 820. Additionally, when an existing group member leaves the group, the corresponding device is removed in operation 828. Finally, when the call is complete, the mesh operation process completes in operation 830.

FIG. 8B illustrates an example in which one or more of the HDs operate as a relay node within the clique. In certain embodiments, the clique includes at least one relay HD node and therefore at least one of the leaf HD can be connected to the CD in the clique. In certain embodiments, the communication passed by CD to one HD can be relayed without additional control mechanism to the relay HD. Embodiments with a relay node simplify the network to maintain high capacity in group calling with more HDs connected in specific clique and to reduce the creation/maintenance of additional CD nodes and data transfer between primary CD node to all other secondary CD nodes.

In operation 802, the mesh formation process 840 starts. It is noted that operation 802 is illustrated for explanation only and the mesh formation process may be continuously running without start or completion (as in operation 830). A new group member joins and a corresponding new device is added in operation 804. In certain embodiments, the number of HDs 310 connectable to a CD is capped at a specified number to maintain call quality. In certain embodiments, the number of one or more CDs 305 connected to the plurality of HDs is optimized (increased or decreased) depending on a call quality metric, power availability of control device and the number of connected plurality of hearing devices. In operation 806, the primary control device determines whether there is a two-member call occurring. If a two-member call is not occurring, a minimum of one CD is required to pair the HDs in operation 808. In response to operations 808 or 810, the primary control device determines wither the partial mesh network is stable in operation 812.

In contrast to mesh formation process 800, in mesh formation process 840, if a two-member call is occurring, one HD (relay device) is connected directly with a first hop CD in operation 844. Thereafter, the process proceeds to operation 812 in which the primary control device determines wither the partial mesh network is stable.

If the network is not stable, the primary control device determines whether more CDs are required in operation 814. If more CDs are required, one or more CDs are added in operation 816. Then, the primary control device switches to another RF technology, if decided by the processing control engine, in operation 818 and the process proceeds to determine whether the call is complete in operation 820. Additionally, if the network is stable in operation 812, the primary control device determines whether the call is complete in operation 820. If the call is not complete, the primary control device again determines whether the partial mesh network is stable in operation 822. If the network is stable, the process proceeds to operation 820 to determine if the call is complete. If the network is not stable, the primary control device determines whether the first hop CD is present in operation 824. If the first hop CD is present, the UI Engine guides a user to move towards the CD if needed in operation 826; otherwise, the process proceeds to operation 814 in which a determination is made again as to whether more CDs are required. If more CDs are not needed in operation 814, the primary control device determines whether the call is complete in operation 820. After the UI Engine has guided the user in operation 826, the primary control device determines whether the call is complete in operation 820. Additionally, when an existing group member leaves the group, the corresponding device is removed in operation 828. Finally, when the call is complete, the mesh operation process completes in operation 830.

FIG. 8C illustrates an example in which one or more of the HDs within the clique are directly connected with each other. In certain embodiments, a direction communication link is established between two leaf nodes/devices connected to the same control device in the clique. The communication between HDs can happen without need to go via the CD. Embodiments with a direct communication link between HDs in the same clique simplifies intra-clique communication between the HDs, without the active need of management/maintenance of CD. Unless, the size of group exceeds the physical limit of CD, direct communication link can be very similar to highly agile push-to-talk radios.

In operation 802, the mesh formation process 850 starts. It is noted that operation 802 is illustrated for explanation only and the mesh formation process may be continuously running without start or completion (as in operation 830). A new group member joins and a corresponding new device is added in operation 804. In certain embodiments, the number of HDs 310 connectable to a CD is capped at a specified number to maintain call quality. In certain embodiments, the number of one or more CDs 305 connected to the plurality of HDs is optimized (increased or decreased) depending on a call quality metric, power availability of control device and the number of connected plurality of hearing devices. In operation 806, the primary control device determines whether there is a two-member call occurring. If a two-member call is not occurring, a minimum of one CD is required to pair the HDs in operation 808. In response to operations 808 or 810, the primary control device determines wither the partial mesh network is stable in operation 812.

In contrast to mesh formation processes 800 and 840, in mesh formation process 850, if a two-member call is occurring, a determination whether the first hop CD is the same for the two HDs in operation 852. If the two HDs share the same CD, the two HDs are paired directly in operation 844. Thereafter, the process proceeds to operation 812 in which the primary control device determines wither the partial mesh network is stable. Otherwise, if the two HDs are connected to different CDs, the process proceeds to operation 808 in which a minimum of one CD is required to pair the HDs.

If the network is not stable, the primary control device determines whether more CD's are required in operation 814. If more CDs are required, one or more CDs are added in operation 816. Then, the primary control device switches to another RF technology, if decided by the processing control engine, in operation 818 and the process proceeds to determine whether the call is complete in operation 820. Additionally, if the network is stable in operation 812, the primary control device determines whether the call is complete in operation 820. If the call is not complete, the primary control device again determines whether the partial mesh network is stable in operation 822. If the network is stable, the process proceeds to operation 820 to determine if the call is complete. If the network is not stable, the primary control device determines whether the first hop CD is present in operation 824. If the first hop CD is present, the UI Engine guides a user to move towards the CD if needed in operation 826; otherwise, the process proceeds to operation 814 in which a determination is made again as to whether more CDs are required. If more CDs are not needed in operation 814, the primary control device determines whether the call is complete in operation 820. After the UI Engine has guided the user in operation 826, the primary control device determines whether the call is complete in operation 820. Additionally, when an existing group member leaves the group, the corresponding device is removed in operation 828. Finally, when the call is complete, the mesh operation process completes in operation 830.

Figure 9:
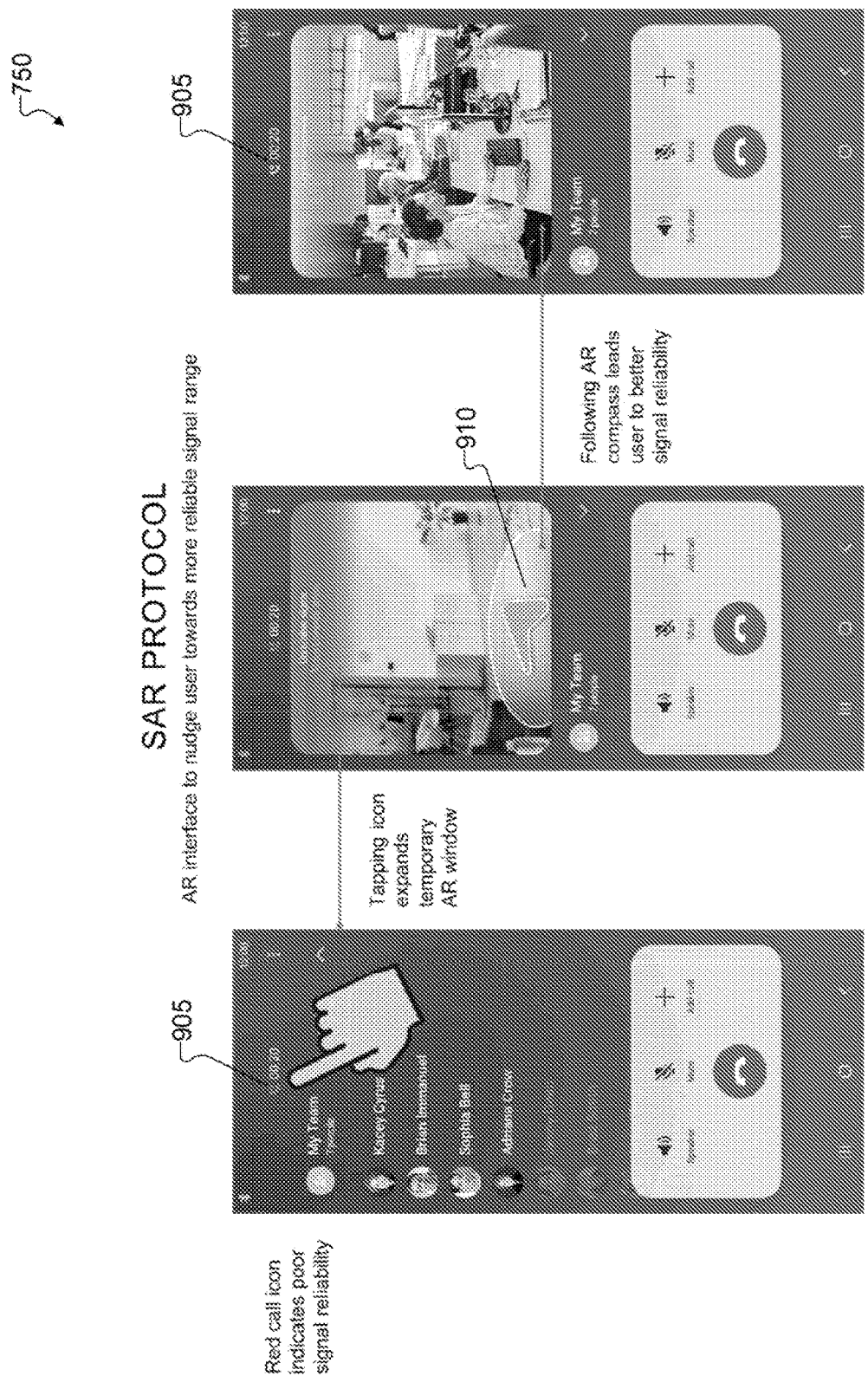
FIG. 9 illustrates an example user interface in accordance with this disclosure.

FIG. 9 illustrates an example user interface in accordance with this disclosure. The embodiment of the UI 900 shown in FIG. 9 is for illustration only. Other embodiments could be used without departing from the scope of the present disclosure.

In the example shown in FIG. 9, a user interface (UI) is displayed on a display of a device when the device is connected to a partial mesh network. The UI can provide an indicator or icon 905 that indicates a poor signal reliability, such as by shape or color (i.e., red). In response to a user input, the display provides a second indicator 910. The second indicator 910 can be an arrow, such as an awareness and reliability (AR) compass. In certain embodiments, the second indicator can be an image, words displayed on the screen, lights or light bars displayed on the screen, and the like. In certain embodiments, the second indicator 910 is an audible or tactile indication. The indicator 910 is configured to direct the user of the device to a location where a signal reliability is better. The UI can further alter icon 905, such as a change in shape or change in color to green to indicate the better signal quality.

Figure 10:
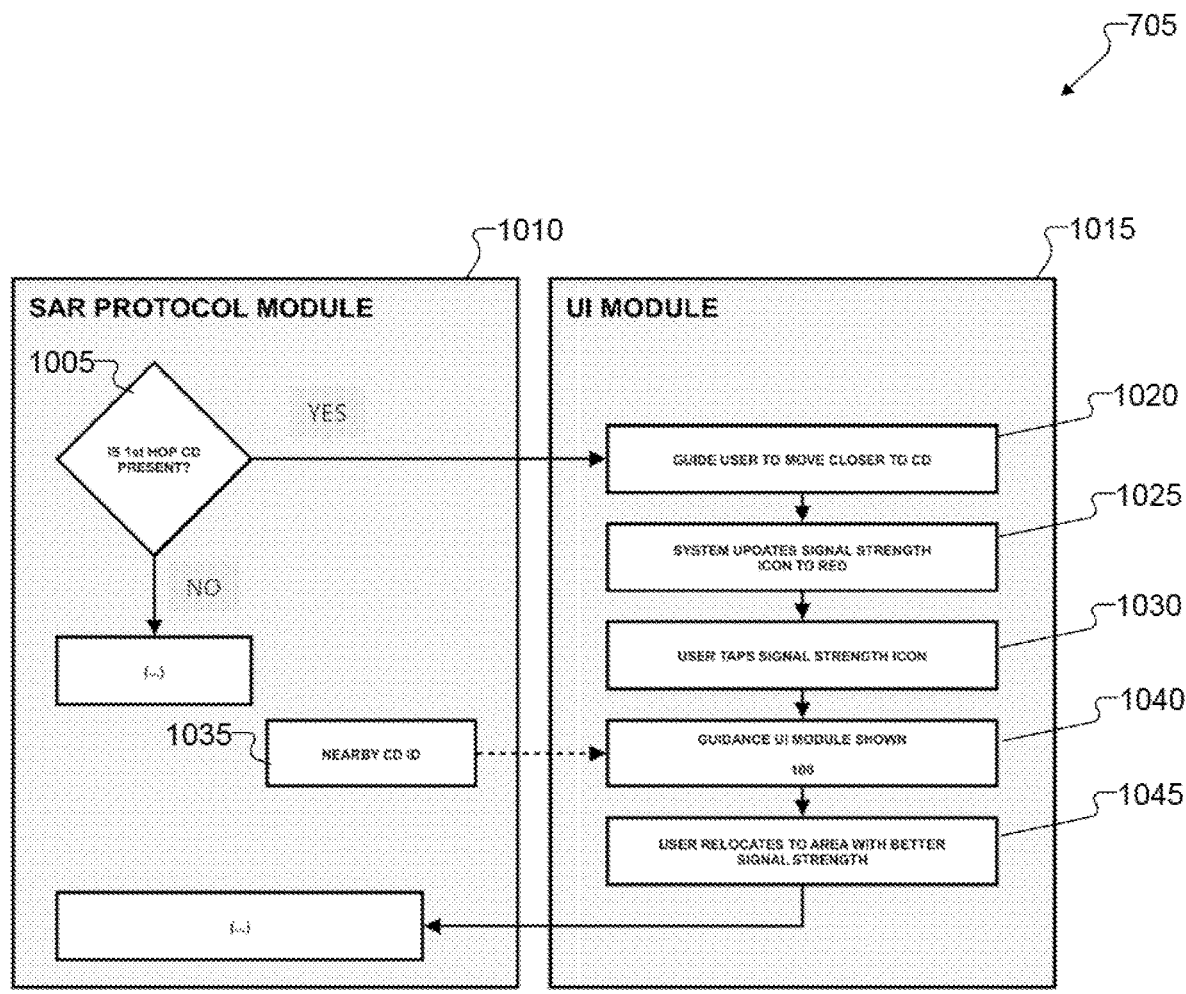
FIG. 10 illustrates an example user interface process in accordance with this disclosure.

FIG. 10 illustrate example user interface processes in accordance with this disclosure. While FIG. 10 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1000 depicted can be implemented by one or more processors in mobile electronic device, such as by one or more processors 120 of an electronic device 101.

In operation 1005, in response to a user device detecting a poor signal reliability, a SAR protocol module 1010 in the user device determines whether a first hop CD is present in operation 1005. If a first hop CD is present, in operation 1005, the UI 1015 provides an indication that the signal reliability is poor and the user should move closer to the CD. In operation 1025, the user device updates the icon to red to indicate the poor signal strength. In certain embodiments, the UI can display different icons for different signal strength conditions, such as different shapes, bars, flashing, dashes, different colors, or a combination thereof. In operation 1030, the device receives a user input corresponding to the icon. For example, the user can tap the icon, depress a button, issue a verbal command, gesture with the mobile device, or the like. In response to the user input, the device obtains a nearby CD ID in operation 1035 and provides the obtained CD ID to a UI guidance module in operation 1040. In operation 1045, the user relocations to the indicated area with better signal reliability.

Figure 11:
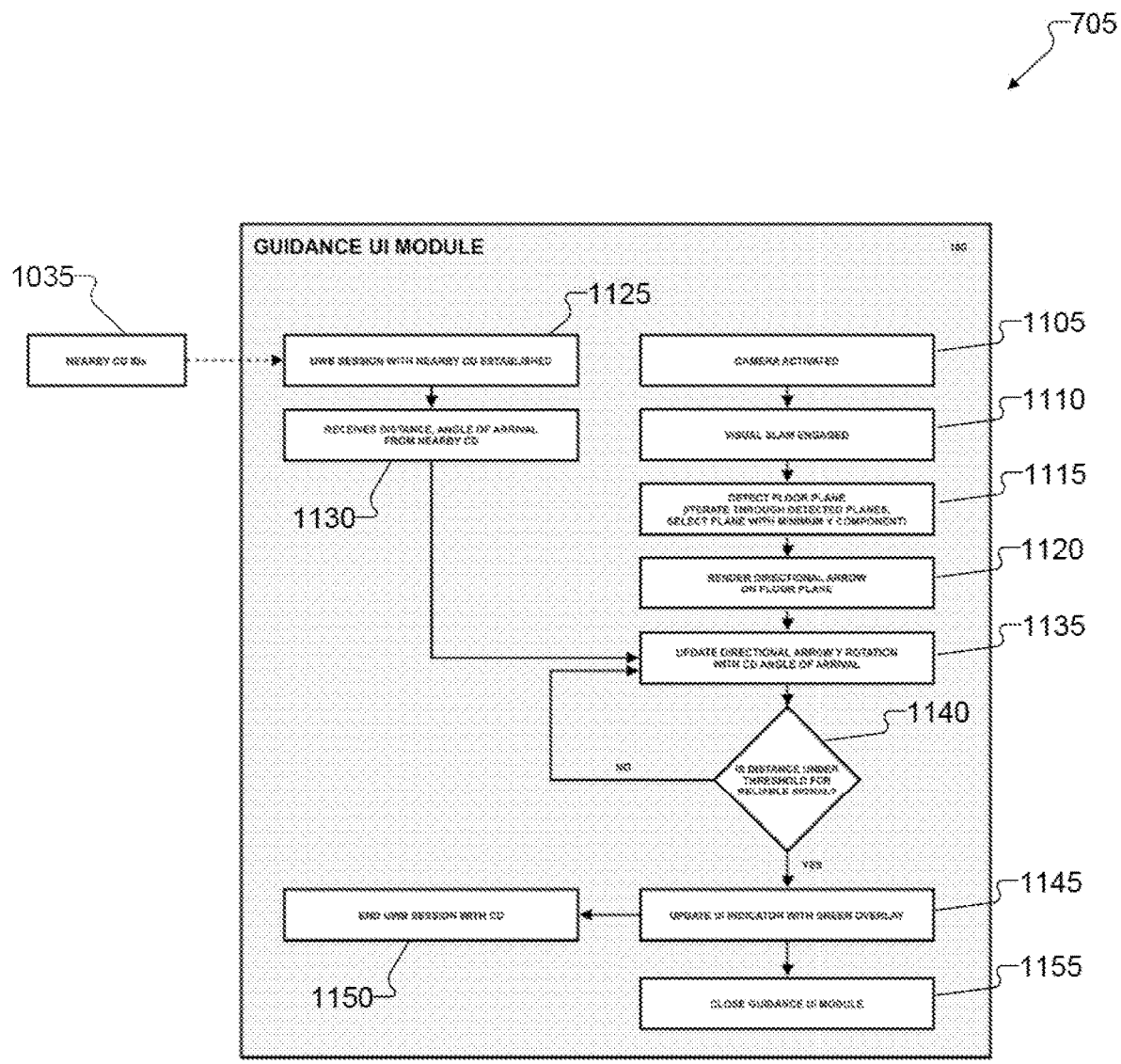
FIG. 11 illustrates example guidance user interface process in accordance with this disclosure.

FIG. 11 illustrates example guidance user interface process in accordance with this disclosure. While FIG. 11 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1100 depicted can be implemented by one or more processors in mobile electronic device, such as by one or more processors 120 of an electronic device 101.

In operation 1105, the device, such as processor 120, activates the camera. In operation 1110, a visual simultaneous localization and mapping (SLAM) is engaged. In operation 1115, the processor 120 detects floor plane. For example, the processor 120 and iteratively proceed to each of multiple detected planes and select a plane with minimum Y component". In operation 1120, the processor 225 renders a directional arrow on the selected floor plane. In operation 1125, in response to receiving the nearby CD IDs from operation 1035, a UWB session with nearby CD is established. In operation 1130, a distance and angle of arrival (AoA) from the nearby CD to the device is obtained. In operation 1135, in response to receiving the rendered directional from operation 1120 and the distance and AoA, the processor 120 updates the directional arrow Y rotation based on the AoA. The processor 120 determines whether the distance to the CD is within a threshold distance for a reliable signal in operation 1140. If the distance exceeds the threshold for a reliable signal, the process returns to operation 1135 to update the arrow. If the distance is within the threshold for a reliable signal, the processor 120 updates the icon 905, such as by changing a color of the icon from red to green. The processor 120 then ends the UWB session in operation 1150 and closes the guidance module in operation 1155.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

Although this disclosure has been described with example embodiments, various changes and modifications may be suggested to one skilled in the art. It is intended that this disclosure encompass such changes and modifications as fall within the scope of the appended claims.

What is claimed is:

1. An electronic device comprising:
a communication circuit configured to communicate via a communication medium, the communication medium comprising a short-range communication medium; and
a processor configured to:
control the communication circuit to connect to a first hearing device (HD) within a signal range of the electronic device; and
in response to determining that a second HD is outside the signal range of the electronic device, identify a control device (CD) different from the electronic device for connection to the second HD, wherein the CD is communicatively coupled with the electronic device via a partial mesh network.

2. The electronic device of claim 1, wherein the communication circuit is configured to utilize a low to mid-range wireless protocol for connecting to the first HD while the first HD is within the signal range of the electronic device and switch to a different protocol when the first HD is outside of the signal range of the electronic device.

3. The electronic device of claim 1, wherein a number of HDs connectable to the electronic device is capped at a set number to maintain call quality, and
wherein a number of CDs connected to a plurality of HDs is increased or decreased depending on one or more of: a call quality metric, power availability of one or more control devices, or the number of HDs connected in the partial mesh network.

4. The electronic device of claim 1, wherein the first HD is connected within its signal range to another HD connected to the electronic device or the CD, and
wherein the first HD is configured to relay communications from the electronic device to the other HD.

5. The electronic device of claim 1, wherein the partial mesh network is implemented by the electronic device and the CD and configured to enable the first HD to communicate directly with one or more HDs without routing communications through the electronic device or the CD.

6. The electronic device of claim 1, wherein the second HD is configured to receive, through a connected device with a display, a visual guidance indicator configured to indicate a direction for movement to a location for better signal quality.

7. The electronic device of claim 1, wherein the electronic device is configured to operate as a primary control device for the partial mesh network based on a name of a current primary control device and a number of connections of the electronic device.

8. A method comprising:
connecting, by a first control device (CD) via a communication medium, to a first hearing device (HD) within a signal range of the first CD, the communication medium comprising a short-range communication medium; and
in response to determining that a second HD is outside the signal range of the first CD, identifying a second CD for connection to the second HD, wherein the second CD is communicatively coupled with the first CD via a partial mesh network.

9. The method of claim 8, wherein connecting to the first HD comprises:
utilizing a low to mid-range wireless protocol for connecting to the first HD while the first HD is within the signal range of the first CD; and
switching to a different protocol when the first HD is outside of the signal range of the first CD.

10. The method of claim 8, wherein a number of HDs connectable to one of the CDs is capped at a set number to maintain call quality, and
wherein a number of CDs connected to a plurality of HDs is increased or decreased depending on one or more of: a call quality metric, power availability of one or more control devices, or the number of HDs connected in the partial mesh network.

11. The method of claim 8, wherein the first HD is connected within its signal range to another HD connected to the first CD or the second CD, and
wherein the first HD is configured to relay communications from the first CD to the other HD.

12. The method of claim 8, wherein the partial mesh network is implemented by the first CD and the second CD and configured to enable the first HD to communicate directly with one or more HDs without routing communications through the first CD or the second CD.

13. The method of claim 8, wherein the second HD is configured to receive, through a connected device with a display, a visual guidance indicator configured to indicate a direction for movement to a location for better signal quality.

14. The method of claim 8, further comprising:
setting the first CD or the second CD as a primary control device for the partial mesh network based on a name of a current primary control device and a number of connections of each CD.

15. A system comprising:
a plurality of control devices (CDs) including a first CD and a second CD; and
a plurality of hearing devices (HDs) wirelessly connected to the CDs, wherein each of the HDs is within a signal range of one or more of the CDs,
wherein, when one or more of the HDs are determined to be outside the signal range of the first CD, the system is configured to identify the second CD for connection to the one or more HDs, and
wherein the second CD is connected to the first CD via a partial mesh network.

16. The system of claim 15, wherein the first CD is configured to utilize a low to mid-range wireless protocol for connecting to each of the HDs while that HD is within the signal range of the first CD and switch to a different protocol when that HD is outside of the signal range of the first CD.

17. The system of claim 15, wherein a number of the HDs connectable to one of the CDs is capped at a set number to maintain call quality, and
wherein a number of the CDs connected to the HDs is increased or decreased depending on one or more of: a call quality metric, power availability of one or more control devices, or the number of connected HDs.

18. The system of claim 15, wherein at least one of the HDs is connected within its signal range to another HD connected to the first CD or the second CD.

19. The system of claim 15, wherein at least two of the HDs connected to the CDs are configured to communicate directly with each other without routing the communication through the CDs.

20. The system of claim 15, wherein at least one of the HDs is configured to receive, through a connected device with a display, a visual guidance indicator configured to indicate a direction for movement to a location for better signal quality.

* * * * *